Sept. 12, 1950 A. T. STARR 2,521,760

ELECTRIC HIGH-FREQUENCY OSCILLATION GENERATOR

Filed Aug. 19, 1947 3 Sheets-Sheet 1

Inventor
Arthur Tisso Starr
By
[signature]
Attorney

ELECTRIC HIGH-FREQUENCY OSCILLATION GENERATOR

Filed Aug. 19, 1947 3 Sheets-Sheet 2

Inventor
Arthur Tisso Starr
By R. P. Morris
Attorney

Sept. 12, 1950 A. T. STARR 2,521,760

ELECTRIC HIGH-FREQUENCY OSCILLATION GENERATOR

Filed Aug. 19, 1947 3 Sheets-Sheet 3

Inventor
Arthur Tisso Starr
By R. P. Morris
Attorney

Patented Sept. 12, 1950

2,521,760

UNITED STATES PATENT OFFICE 2,521,760

ELECTRIC HIGH-FREQUENCY OSCILLATION GENERATOR

Arthur Tisso Starr, London, England, assignor to International Standard Electric Corporation, New York, N. Y., a corporation of Delaware Application August 19, 1947, Serial No. 769,547
In Great Britain August 16, 1946

Section 1, Public Law 690, August 8, 1946
Patent expires August 16, 1966

8 Claims. (Cl. 332—7)

The present invention relates to electric high frequency oscillators, and is concerned with means for stabilising the amplitude and/or the frequency of the oscillations.

In the U. S. patent of L. A. Meacham entitled "Stabilized Oscillator," Patent No. 2,163,403, issued June 20, 1939, there is described an oscillation generator which includes in the positive feedback loop a Wheatstone bridge network having a lamp or other thermally sensitive resistance in one arm. The bridge forms an attenuating network of which the input and output terminals are respectively the two pairs of diagonal terminals of the bridge, and the lamp operates automatically to stabilise the amplitude of the oscillations by increasing the attenuation of the network when the oscillation amplitude tends to increase, and vice versa.

The principal object of the present invention is to apply similar principles to the amplitude stabilisation of very high frequency oscillators, such for example as oscillators employing electron velocity modulation devices.

It is well known that an alternating current Wheatstone bridge network can assume a number of equivalent forms, of which one is the three-winding transformer or conjugate network used in low frequency telephone repeaters. Another form suitable for short waves comprises four wave-guides arranged for intercommunication at a junction point in conjugate fashion. It is this latter form which is preferred in the case of the present invention, and which will be referred to for convenience as a "short-wave" bridge.

The invention accordingly provides a stabilised high frequency electric oscillation generator comprising an amplifier of the electron velocity modulation type having the input and output resonators coupled by a short-wave bridge, a frequency determining resonator and a thermally sensitive resistance element for stabilising the amplitude of the oscillations, both of which are connected to the said bridge, and means for deriving the oscillations from one of the first mentioned resonators.

In a preferred embodiment of the invention, which will be described in detail later, the short-wave bridge is arranged for transmission of waves between an input wave-guide and an output wave-guide. The two other wave-guides which comprise the bridge are connected respectively to a constant impedance such as a resonator, (which may be adjustable) and to a variable or control impedance element which includes a thermally sensitive resistance, such as a thermistor. The short-wave bridge is associated with an electron velocity modulation amplifier of a type known as a travelling wave amplifier, consisting of an electron gun arranged to direct a beam of electrons through two resonators which are coupled by a wire helix surrounding the electron beam. Both resonators are tuned broadly to the frequency desired for the oscillations. The input wave-guide is coupled to the second or energy extracting resonator, and the output wave-guide is coupled to the first or velocity modulating resonator. The short-wave bridge thus forms the feed-back path associated with the high frequency amplifier, so that oscillations will be generated. The oscillations may be extracted by means of a wave guide which is coupled to, or forms an extension of, the second resonator and which leads to the apparatus in which the oscillations are utilised.

The bridge resonator should be tuned to the desired oscillation frequency and should preferably have a high Q value. The thermistor or other thermally sensitive resistance, and the lengths of the wave-guide sections will be chosen so that the short-wave bridge is nearly balanced when the device is oscillating at the desired amplitude, or in other words there will be a relatively high transmission loss measured from the input wave-guide to the output wave-guide. According to the principles of the aforementioned U. S. Patent No. 2,163,403 the bridge impedances should be so selected that when for any reason the oscillation amplitude increases, the change in resistance of the thermally sensitive resistance is such as to increase the transmission loss through the bridge, and so that when the oscillation amplitude decreases the transmission loss decreases, so tending to stabilise the amplitude of the oscillations.

This arrangement can also be used to stabilise the frequency of the oscillations. A small change of frequency will cause a transmission phase shift through the bridge since it will cause the bridge resonator to become untuned. This phase shift is approximately proportional to the Q value of the resonator and should be arranged to be in such a direction as to oppose the change in frequency, so that any such change is strongly resisted. It can be shown, for example, that if the Q value of the bridge resonator is $10^5$ it is possible to achieve a frequency stability of about 1 part in $2\times10^7$.

It should be noted that the control impedance of the short-wave bridge will preferably have a fixed reactive component and a variable thermally sensitive resistive component, but this is not essential. By proper choice of the lengths of the corresponding wave-guide, the impedance of the control element may vary with the amplitude of the oscillations over any definite path of the complex diagram representing the resistances and reactance of the element.

A similar arrangement may be used to provide frequency modulated waves of constant amplitude. In this case the low frequency modulating waves are supplied to the control element, any suitable condenser arrangements being used to keep the high frequency waves out of the low frequency circuits. In the simplest case the modulating signal varies the resistance of the control element, which may take the form of a thermister whose resistance to the high frequency waves is varied by the low frequency waves. The length of the wave-guide is so chosen that the reactance of the impedance of the control element as seen from the short-wave bridge appears to vary, the resistance component remaining constant. As already explained, the effect is to vary the phase of the waves transmitted through the bridge, so varying the oscillation frequency. In order to stabilise the amplitude of the modulated oscillations, a thermistor may be included at another point in the wave-guide such that it appears from the bridge as a resistance, so that the oscillations will be stabilised in the manner already explained. If the signal waves vary both the resistance and the reactance of the control element, the length of the guide should be chosen so that only the reactance component of the impedance, as seen from the bridge, varies.

It will be understood that any of the known impedance transforming arrangements may be used suitably to convert the values and phase angles of the impedances employed, such as quarter wave transformers, stub lines connected at suitable points, and so on. The term "wave-guide" used in the present specification must be understood to include co-axial lines and other types of transmission lines with or without any of the known transforming arrangements such as have been mentioned.

Another embodiment of the invention is based on the same principles and employs wave-guides in the form of co-axial lines, and a different type of short-wave bridge is used. The travelling wave amplifier is in this case replaced by an electron velocity modulation device of conventional type employing input and output resonators separated by a drift space.

The embodiments of the invention will be described with reference to the accompanying drawings, in which.

Figure 1:
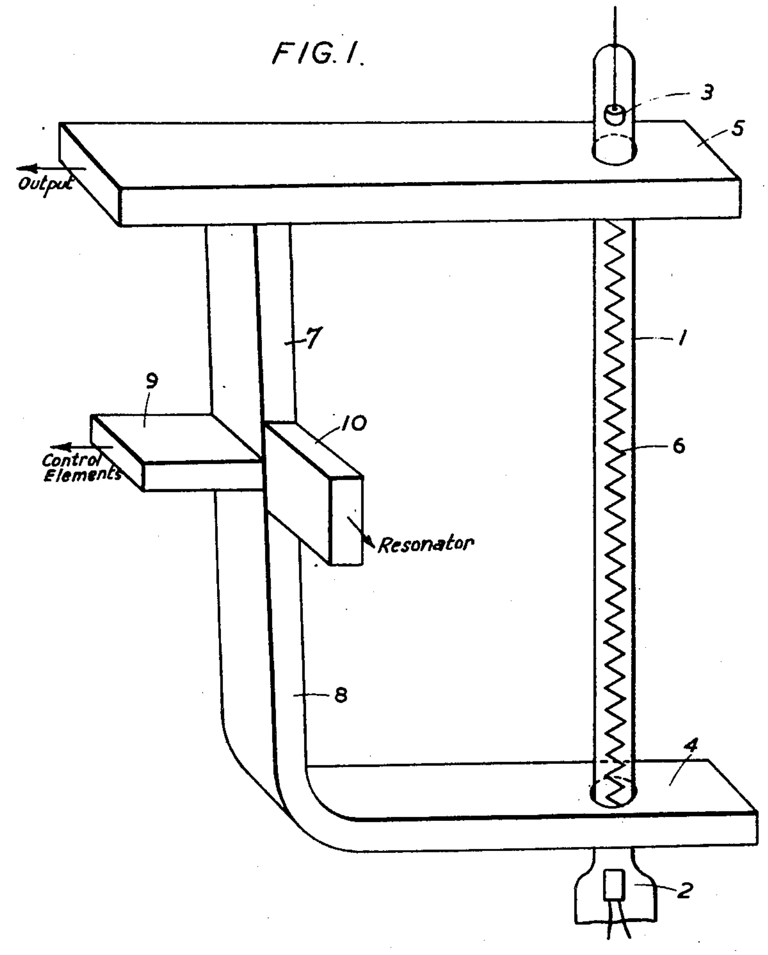
Fig. 1 shows a perspective view of the preferred form of oscillation generator according to the invention which employs rectangular wave-guides and a travelling wave amplifier.

The preferred embodiment of the invention already described in general terms is shown in Figs. 1 to 5. Fig. 1 shows a perspective view of the apparatus in which certain wave-guides have been cut off short to make the diagram clear.

The travelling wave amplifier, which is fully described in three articles in the "Proceedings of the Institute of Radio Engineers," February, 1947, by Messrs. R. Kompfner and J. R. Pierce, consists of a long glass tube 1 having an electron gun 2 at the lower end and a collecting electrode 3 at the upper end. The tube 1 extends through holes in the walls of two horizontal resonators, namely, an input resonator 4 and an output or energy-extracting resonator 5. These resonators are of rectangular section and may be formed of sections of wave-guides, and should be broadly tuned to the frequency desired for the oscillations. Between the two resonators 4 and 5 inside the glass tube there extends a wire helix 6, the ends of which terminate on metal sleeves (not visible in Fig. 1) inside the resonators 4 and 5. A beam of electrons is fixed from the gun 2 along the axis of the helix 6, and impinges on the electrode 3 which collects the electrons.

The glass tube is usually but not necessarily surrounded by a metal tube (not shown in Fig. 1), which is secured at the ends to the resonators 4 and 5. A focussing solenoid (also not shown in Fig. 1) is preferably provided coaxially surrounding the glass tube 1, outside the metal tube if the latter is present.

A rectangular guide 7 of similar section to the resonators 4 and 5 communicates with the resonator 5, which resonator continues as a wave-guide as far as may be desired in the duration of the arrow to deliver the power generated to the apparatus (not shown) where it will be utilised. The resonator 4 also continues as a wave-guide 8 and is bent round as indicated to form a continuation of the guide 7.

Two rectangular guides 9 and 10 branch off at right angles at the junction of the guides 7 and 8. The guide 9 branches perpendicularly to the wider wall of the guides 7 and 8 and the larger dimension of its cross-section is transverse to the guides 7 and 8. The guide 10 branches perpendicularly to the narrower wall of these guides, but the larger dimension of its cross-section is arranged longitudinally with respect to the guides 7 and 8. The guide 10 is also symmetrically placed with respect to the central plane of the guide 9. It will be understood that the guides 7 and 8 actually form one continuous guide with apertures in the walls for communication with the guides 9 and 10.

The guide 9 extends some distance in the direction of the arrow and is terminated by one or more control elements in a manner to be explained more fully later. Likewise the guide 10 extends further in the direction of the arrow and then terminates in a suitable resonator, which should have a high Q value, and should be tuned to the frequency desired for the oscillations.

The four guides 7, 8, 9 and 10 form at their junction a short-wave bridge which has the property that if the impedances effectively presented by the guides 9 and 10 to the bridge are equal, then the guides 7 and 8 are conjugate, and vice-versa. In practice, the impedances presented by the guides 9 and 10 are not quite equal, and so a small proportion of the energy supplied by the guide 7 is delivered to the guide 8. The waves produced in the guide 8 and resonator 4 travel along the helix 6 in the manner explained in the above-quoted publications, and continuously modulate the velocity of the electrons of the beam as they travel along the axis of the helix, and the modulated electrons communicate their energy to the resonator 5, as in the conventional electron velocity modulation devices. The amplified energy is thus fed round again, and sustained oscillations are produced at a frequency determined principally by the impedances presented by the guides 9 and 10.

It should be explained at this point that a short-wave bridge essentially consists of a junction of four wave-guides (or co-axial lines) so disposed and dimensioned that when the impedances presented at the junction by the four guides or lines are suitably proportioned, the guides or lines are conjugate in pairs.

In such a short-wave bridge there is in general no single point or location at which all the guides can properly be said to join; but corresponding to each guide there is some definite point at or near the end connected to the bridge at which the guide can be said to commence, and for which the lengths along the guide are measured. This point will be called the "bridge terminal" of the guide. The bridge terminals of two or more of the guides may in some cases coincide.

Figures 2, 3, 4, 5:
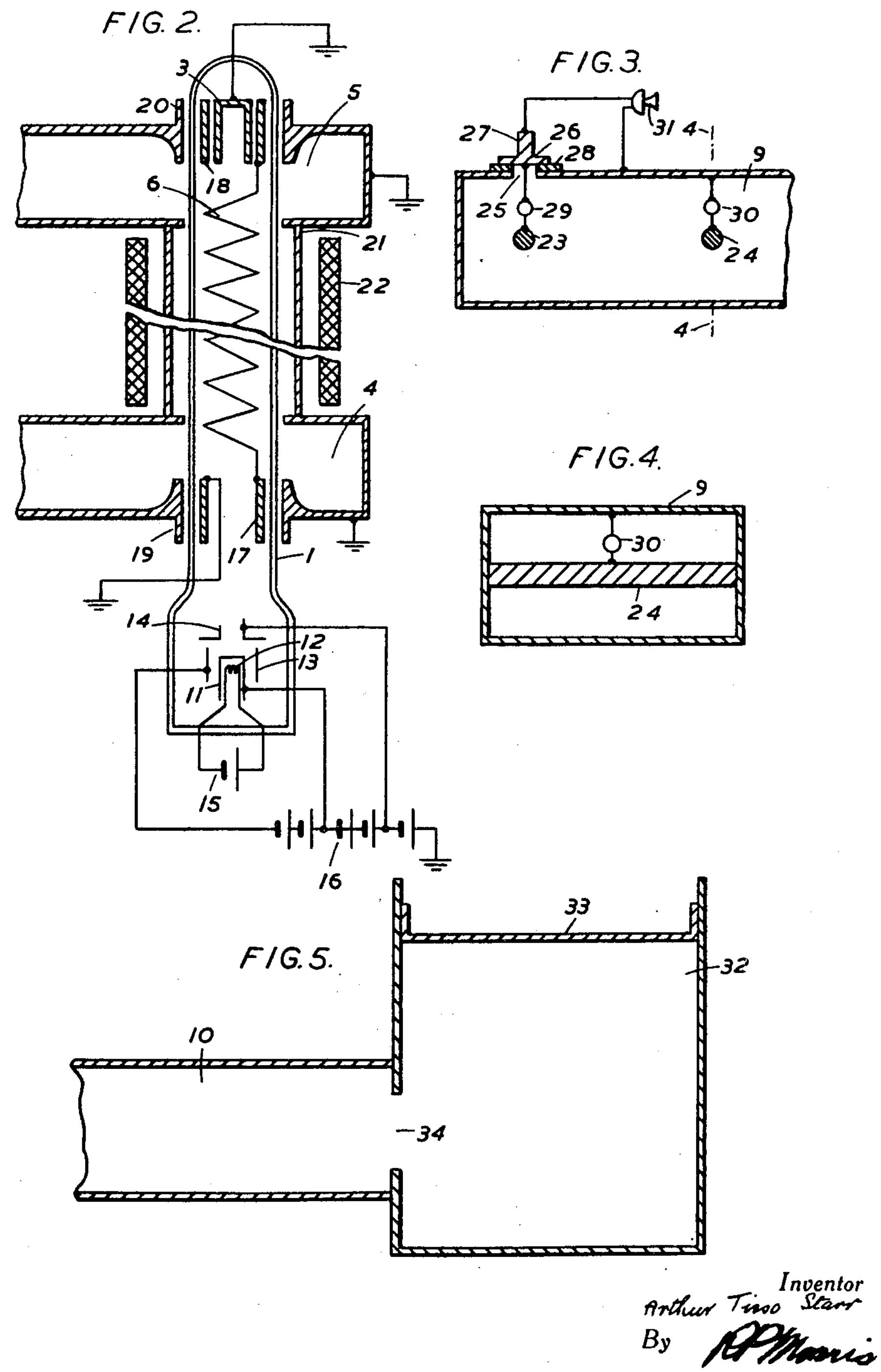
Fig. 2 shows a sectional view to a larger scale of the amplifier.
Fig. 3 shows a longitudinal section of the end portion of one of the wave-guides of the generator to show how the controlling thermistors are connected.
Fig. 4 shows a transverse section at 4—4 of Fig. 3.
Fig. 5 shows a longitudinal section of the end portion of another guide and of the resonator to which it is connected.

In Fig. 2, a sectional view of the travelling wave amplifier is shown on a larger scale to indicate some of the details more clearly. The electron gun at the lower end of the tube 1 comprises the usual cathode 11, with its heater 12, a focussing electrode 13, and an accelerating electrode 14.

The heater 12 is supplied from a low potential heating source 15, and a high potential source 16, with positive terminal earthed is provided for the other electrodes. The electrodes 11, 13 and 14 may for example, be connected to taps on the source 16 at voltages of about −2,300, −1,500 and −2,000, respectively. The guides and collecting electrode 3 are all earthed.

The helix 6 is connected at its ends to two similar metal cylinders 17 and 18 which cooperate with similar cylindrical flanges 19 and 20 connected through the walls of the guides 4 and 5 to form quarter wave lines. The upper end of the cylinder 17 is earthed. The flanges 19 and 20 are expanded into mushroom form inside the guides, as shown.

The metal tube surrounding the glass tube 1 already mentioned is shown at 21, and the focussing solenoid is shown at 22. It has already been stated that the tube 21 is not essential and could be omitted.

The helix 6 should preferably be arranged so that about one turn is included inside each of the guides 4 and 5.

Figs. 3 and 4 show the manner in which the control elements are connected at the end of the guide 9. Referring to the longitudinal section, Fig. 3, two metal rods or posts 23 and 24 are fixed between the walls of the guide, in the manner indicated by the transverse section Fig. 4 for the post 24. In the upper wall of the guide opposite the post 23 is made a small aperture 25 which is closed by a small metal disc 26 having a terminal 27. The disc is insulated from the wall of the guide by a thin mica washer 28.

A thermistor 29 of the directly heated type is connected between the post 23 and the disc 26 as shown.

A second thermistor 30 is connected between the post 24 and the wall of the guide 9. This thermistor is also seen in Fig. 4.

The thermistor 30 is provided for stabilising the amplitude of the oscillations generated by the device, and the thermistor 29 is used for frequency modulating the oscillations. For this purpose, a signal source such as a transmitter 31 will be connected between the terminal 27 and the wall of the guide as shown. If it is not desired to modulate the oscillations, the elements 23, 26 to 29 and 31, and the aperture 25 can all be omitted.

Fig. 5 shows a longitudinal section of the end of the guide 10 to indicate how it may be coupled to the resonator 32. This resonator is preferably of cylindrical form, a diametrical section being shown. A gliding piston 33 may be provided for tuning the resonator. The guide 10 terminates on the outer surface of the resonator, and communication between the guide and the inside of the resonator is provided by a slot 34 of suitable dimensions in the wall of the resonator.

It is necessary to proportion the lengths of the guides 9 and 10 in the proper manner to obtain the desired result. How this is done may be understood from the following explanation.

Let $E_0$ be the electric vector in the guide 7 at the bridge terminal of the guide, and let E be the corresponding vector in the guide 8. As already explained if the bridge were balanced, $E_1$ would be zero. If $Z_p$ and $Z_q$ are the impedances presented to the bridge by the guides 9 and 10, then $$E_1/E_0=K(Z_p-Z_q)$$

where K is a quantity involving the factor $Z_p+Z_q$ and can be regarded as practically a constant for small variations of $Z_p$ and $Z_q$.

Let G be the amplification ratio of the amplifier, as measured from the bridge terminal of the guide 8 to the bridge terminal of the guide 7. Then G is in general a complex quantity.

When sustained oscillations occur, $$G=E_0/E_1=1/K(Z_p-Z_q)$$

or $$Z_p-Z_q=1/KG=z\angle A$$

If the resonator 32 (Fig. 5) is tuned to a frequency F, and $R_q$ is the resistance which it presents to the guide 10 at resonance, and Q is the ratio of reactance to resistance of the resonator, then the impedance of the resonator will be equal to $R_q(1+2jQdF/F)$ at a frequency $F+dF$ differing slightly from F. If the resonator be connected at a distance of an integral number of half wave lengths from the bridge terminal of the guide, then $Z_q=R_q(1+2jQdF/F)$. If the thermistor 29 of Fig. 3 and the associated elements be supposed to be omitted, and the thermistor 30 be placed at distance from the bridge terminal of the guide equal to an integral number of quarter wave lengths, then $Z_p$ will be substantially a pure resistance $R_p$.

The condition for oscillation will therefore be $$R_q-R_q(1+2jQdF/F)=\angle A=z\cos A+jz\sin A$$

Hence $$R_p-R_q=z\cos A \qquad (1)$$

and $$-2R_qQdF/F=z\sin A \qquad (2)$$

It will be assumed that the temperature coefficient of the thermistor is (as usual) negative, and that cos A is positive. Then for Equation 1 to be satisfied $R_p$ must be slightly greater than $R_q$. If, for example, the amplification ratio G of the amplifier should increase, there would normally be a tendency for the amplitude of the oscillations to increase. Since, however, $z$ is proportional to 1/G Equation 1 will still be satisfied if $R_p$ decreases. An increase in oscillation amplitude will reduce the resistance of the thermistor, and therefore if the thermistor is placed at a distance of an even number of quarter wave lengths from the bridge terminal, $R_p$ will be reduced as desired, and this will correct the tendency of the amplitude of the oscillations to increase.

If, however, cos A is negative, then the preliminary adjustment to satisfy Equation 1 should be such that $R_p$ is slightly less than $R_q$, and the thermistor should be placed at a distance of an odd number of quarter wave lengths from the bridge terminal. In this case the resistance $R_p=Z_0^2/R_t$ where $Z_0$ is the characteristic impedance of the guide, and $R_t$ is the resistance of the thermistor. $R_p$ will now increase with increase of oscillation amplitude, as desired. This arrangement is also required if cos A is positive and the thermistor has a positive instead of a negative temperature coefficient.

If Equation 2 be divided by Equation 1, there is obtained the result $$\frac{2QdF/F}{R_p/R_q-1}=-\tan A$$

It can be shown that the factor $R_p/R_q-1$ is of the same order as 1/G, and so approximately $$2GQdF/F=-\tan A \qquad (3)$$

The angle A represents chiefly the phase change suffered by transmission through the amplifier and will usually be a small angle. Equation 3 gives the percentage frequency shift caused by the angle A. If A remains constant, the oscillation frequency remains constant and differs from the resonance frequency F of the resonator 32 by a very small amount dF. If the Equation 3 be differential the result obtained is $$d(dF/F)=-\sec^2 A dA/2GQ$$

Thus since $\sec^2$A is nearly equal to 1 where A is small, thus shows that the percentage frequency change produced by a small change $d$A of the angle A is approximately equal to $d$A/2GQ. Since Q can easily be made equal to about $10^5$ and G about 10, it follows that a change in A of say 0.1 radian, would only produce a change in frequency of 1 part in $2\times10^7$. The arrangement therefore has a high degree of frequency stability.

One method of modulating the frequency of the oscillations is effectively to shunt the impedance $Z_p$ of the guide 9 with a reactance which can be varied by a modulating signal. This may be done by means of the thermistor 29 (Fig. 3) if the latter is placed at a point which is distant an odd multiple of one eighth of the wave length from the bridge terminal of the guide. In this case the resistance of the thermistor will be transformed by the wave guide so that it appears as a reactance at the bridge terminal. If the resistance of the thermistor is varied by the microphone 31 for example, then the corresponding reactance is varied likewise and will vary the oscillation frequency accordingly. The thermistor 29 could, for example, be placed at a distance of one eighth of the wavelength from the thermistor 30. Any other element having a resistance which can be varied by an applied voltage could be used instead of the thermistor 29. For example, a rectifier or a gas discharge diode could be used, a suitable polarising battery (not shown) being connected in series with the modulating signal source 31 if necessary.

It is also possible to use a complex impedance element both components of which are varied by the signal voltage so long as it is connected at such a distance from the bridge terminal that it appears as a variable reactance.

It will be preferable that any variable element in this way for modulating the frequency of the oscillations should not produce at the bridge terminal a variable resistance component, otherwise the oscillations will be also amplitude modulated.

Figures 6, 7, 8:
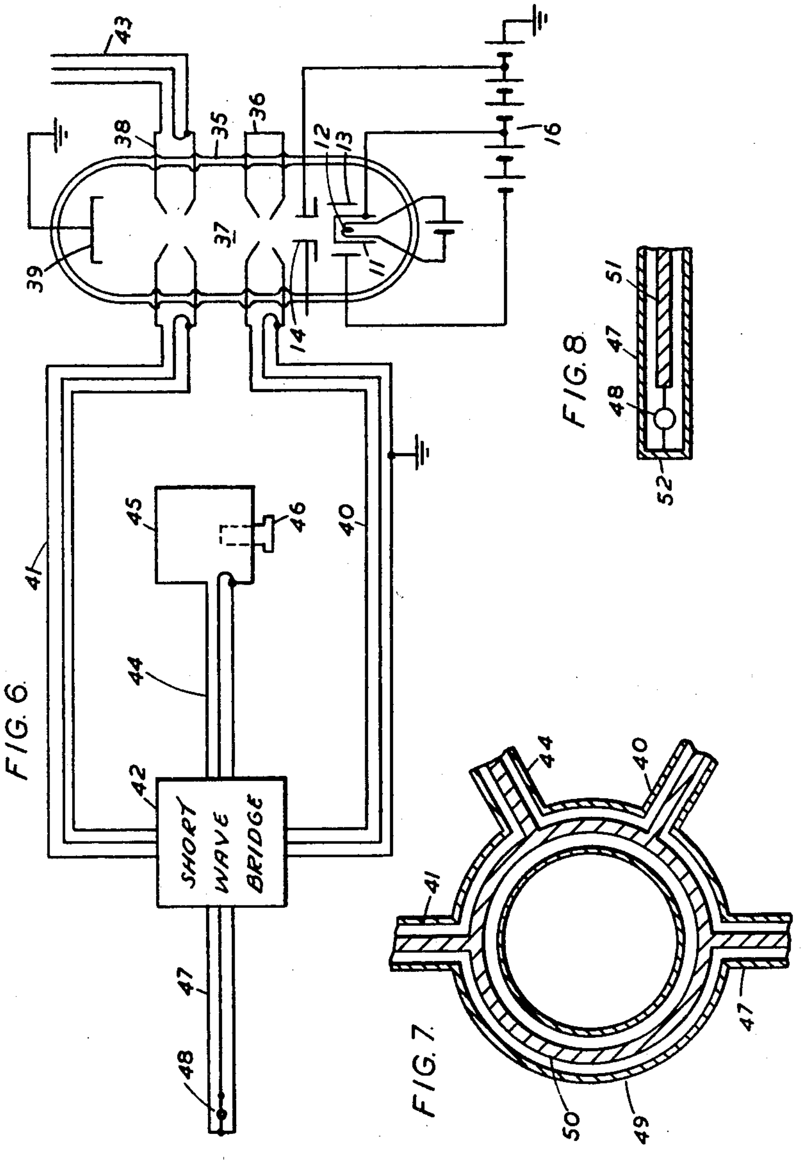
Fig. 6 shows a diagrammatic view of another oscillation generator according to the invention.
Fig. 7 shows a longitudinal section of the end portion of one of the co-axial lines of the generator to show how the controlling thermistor is connected.
Fig. 8 shows a section of the short-wave bridge used in this generator.

Figs. 6, 7 and 8 show another embodiment of the invention operating on the same principles, but employing a conventional electrode velocity modulation device, and co-axial lines for the wave-guides. A different type of short-wave bridge is also used.

Fig. 6 shows a diagrammatic view of the arrangement. The velocity modulation device comprises a glass envelope 35 containing an electron gun having elements which are similar to those shown in Fig. 2, and which have been given the same designations. Similar supply arrangements may be used.

The envelope 35 supports an input or velocity modulating resonator 36 separated by a drift space 37 from an output or energy extracting resonator 38. The electron beam is fired through the two resonators in the usual way, and is collected by the grounded electrode 39. Two similar co-axial lines 40 and 41 respectively connect the resonators 36 and 38 to the short-wave bridge 42. These co-axial lines are coupled by small inductive loops to the resonators as indicated. An output co-axial line 43 is coupled by a loop to the resonator 38 and conveys the oscillations to the antenna or other utilisation device.

The short-wave bridge is connected by a co-axial line 44 to a resonator 45 which may be provided with a plunger 46 for tuning purposes. A co-axial line 47 having a stabilising thermistor 48 at the distant end also connected to the short-wave bridge.

Fig. 7 shows on a larger scale a section of the short-wave bridge 42. It comprises a co-axial line arranged as a closed ring 49, the central conductor of which is 50. Branching from the ring are the four co-axial lines 40, 41, 44 and 47 of Fig. 6. Only the ends of these lines are shown in Fig. 7.

The ring 49 should be so dimensioned that the difference between the lengths of the two ring sections of co-axial line connecting the lines 40 and 41 and between the lengths of the sections connecting the lines 44 and 47 is an odd number of half wave lengths. Preferably also the sections between adjacent lines should be an odd number of quarter wave lengths. This arrangement ensures that waves reaching the line 40 from the line 41 over the two paths round the ring will be in opposite phase and so will cancel out if the impedances presented by the lines 44 and 47 are equal. The lines 40 and 41 will accordingly be conjugate. Similarly the lines 44 and 47 will be conjugate. It will be clear that the members of the conjugate pairs must be arranged alternately round the ring.

In one arrangement fulfilling the above conditions, the circumferential length of the ring portion of the short-wave bridge is equal to one and a half wave lengths, the co-axial lines 41 and 47 entering at diametrically opposite points. The co-axial lines 40 and 44 are spaced equally at quarter wave length intervals between the lines 41 and 47 on one side of the ring. The shorter distance between the lines 40 and 41 round the ring will accordingly be half a wave length, and the longer distance a whole wave length, and similarly for the lines 44 and 47.

It will be evident that the ring need not be circular as shown, but could have any shape provided the lengths of the sections of the ring conform with the above stated requirements.

Fig. 8 shows to a larger scale the manner in which the stabilising thermistor 48 may be connected at the end of the co-axial line 47. The thermistor is connected between the end of the central conductor 51 of the line and the closed end 52 of the outer conductor. According to the same principles as explained with reference to the arrangement of Fig. 1, if the thermistor is used for stabilising the amplitude of the oscillations generated by the device, the distance between the thermistor and the bridge terminal of the guide 47 (which is at the point where it joins the ring) should be an odd or an even number of quarter wave lengths, according to the manner in which it is desired that the resistance presented by the co-axial line 47 should vary with variations in the amplitude of the oscillations. A second thermister (not shown) (or other controllable non-linear resistance element) could be connected between the inner and outer conductors of the line 47 in the manner described with reference to Fig. 3 for the thermistor 28, at a distance of an odd multiple of one eighth of the wave length from the bridge terminal of the line, for modulating the frequency of the oscillations in the manner previously described.

It will be understood that the arrangement of Fig. 6 operates according to exactly the same principles as Fig. 1, and will be dimensioned according to the same rules.

It should be noted that the short-wave bridge described with reference to Fig. 1 could be replaced by one similar to Fig. 7 with the central conductors omitted, and the guides 7, 8, 9 and 10 would enter the ring guide at the same points as the lines 41, 40, 47 and 44 respectively.

The short-wave bridges used in Figs. 1 and 6 could take various other physical forms.

I claim:

1. A stabilised high frequency electric oscillation generator comprising an amplifier of the electron velocity modulation type having an input and output resonator, a short wave bridge, corresponding wave guides connecting said input and output resonators to respective terminals of said short wave bridge, a frequency determining resonator, and a thermistor for stabilising the amplitude of the oscillations, separate wave guides coupling said frequency determining resonator and thermistor to respective terminals of said bridge and means for deriving the oscillations from the said output resonator.

2. A generator according to claim 1 in which the frequency determining resonator is coupled at a distance equal to an integral multiple of half the wavelength of the oscillations from its respective bridge terminal of the bridge, and in which the thermistor is coupled at a distance equal to an integral multiple of a quarter of the said wavelength from its respective bridge terminal of the bridge.

3. A generator according to claim 2 comprising a variable impedance element coupled to the wave guide associated with the thermistor, a modulating signal source, and means for applying a modulating signal to vary the said impedance element in such manner as to modulate the frequency of the oscillations in accordance with the said signal.

4. A generator according to claim 3 in which the said impedance element comprises a second thermistor placed in the guide associated with the first named thermistor at a distance from the bridge terminal of the guide equal to an odd integral multiple of one eighth of the wavelength of the oscillations.

5. A generator according to the claim 2 in which the said wave-guides are of rectangular section, and in which the short-wave bridge comprises said input and output resonator wave guides being coextensive in one direction, said frequency stabilizing thermistor guide being coextensive with said input and output resonator guides in a direction at right angles to said one direction, and said frequency determining resonator guide joining said input and output resonator guides in a direction perpendicular to each of said directions.

6. A generator according to the claim 1 in which the short-wave bridge comprises a wave guide in the form of a closed ring, the said wave guides being branched off the said ring at four points round the periphery of the ring.

7. A generator according to claim 6 in which all the wave guides are co-axial lines.

8. A generator according to claim 7 in which the amplifier is a travelling wave amplifier.

ARTHUR TISSO STARR.

REFERENCES CITED

The following references are of record in the file of this patent:

UNITED STATES PATENTS

| Number | Name | Date |
|---|---|---|
| 2,271,519 | Wolf | Feb. 3, 1942 |
| 2,281,935 | Hansen et al. | May 5, 1942 |
| 2,410,840 | Samuel | Nov. 12, 1946 |
| 2,421,725 | Stewart | June 3, 1947 |
| 2,462,841 | Bruck et al. | Mar. 1, 1949 |